US012734559B2

(12) United States Patent
Lim

(10) Patent No.: US 12,734,559 B2
(45) Date of Patent: Sep. 15, 2026

(54) SPRAY NOZZLE FOR WASHING

(71) Applicant: Young Kyoun Lim, Incheon (KR)

(72) Inventor: Young Kyoun Lim, Incheon (KR)

( * ) Notice: Subject to any disclaimer, the term of this patent is extended or adjusted under 35 U.S.C. 154(b) by 215 days.

(21) Appl. No.: 18/714,558

(22) PCT Filed: Oct. 25, 2022

(86) PCT No.: PCT/KR2022/016312
§ 371 (c)(1),
(2) Date: May 29, 2024

(87) PCT Pub. No.: WO2023/113207
PCT Pub. Date: Jun. 22, 2023

(65) Prior Publication Data

US 2025/0041905 A1 Feb. 6, 2025

(30) Foreign Application Priority Data

Dec. 14, 2021 (KR) ........................ 10-2021-0178414

(51) Int. Cl.
*B08B 3/02* (2006.01)
*B05B 3/04* (2006.01)

(52) U.S. Cl.
CPC .............. *B08B 3/02* (2013.01); *B05B 3/0444* (2025.08); *B08B 2203/02* (2013.01)

(58) Field of Classification Search
CPC ...... B08B 3/02; B08B 2203/02; B05B 3/0444
USPC ........................................................ 239/501
See application file for complete search history.

(56) References Cited

U.S. PATENT DOCUMENTS 4,319,965 A * 3/1982 Parker ........................ C02F 1/16 203/99
4,344,479 A * 8/1982 Bailey ........................ F23C 9/00 165/DIG. 321
5,398,519 A * 3/1995 Weber ................ H05K 7/20381 62/99
5,474,043 A * 12/1995 Mallen .................... F01C 3/025 418/152
5,577,664 A * 11/1996 Heitzman ............. B05B 1/0854 239/602
6,485,022 B1 * 11/2002 Fedorovich .......... F16J 15/4478 277/303
7,520,448 B2 * 4/2009 Luettgen ................. B05B 1/085 239/383

(Continued)

FOREIGN PATENT DOCUMENTS

KR 20-0291462 B1 10/2002

*Primary Examiner* — Chee-Chong Lee
(74) *Attorney, Agent, or Firm* — Goldlocks ZONE IP LAW

(57) ABSTRACT

The present invention relates to a spray nozzle for washing, in which: a linear spray inlet and a spiral spray inlet are integrally formed in one nozzle body, and thus, linear and spiral washing water can be selectively sprayed by operating organically; the lower end of a nozzle tip, which forms the spiral washing water, moves circumferentially around the axis, and the upper end makes linear contact within a packing, thereby preventing abrasion caused by friction and forming the spiral washing water without frictional resistance even in the case of weak water pressure; and when forming the spiral washing water, a backflow preventing member closes the linear jet inlet, and thus, backflow can be prevented, thereby enabling leakage prevention of washing water and a stable operation.

7 Claims, 8 Drawing Sheets

(56) References Cited

U.S. PATENT DOCUMENTS

| | | | | |
|---|---|---|---|---|
| 7,597,784 | B2 * | 10/2009 | Bednarek | B01D 1/28 203/40 |
| 7,740,186 | B2 * | 6/2010 | Macan | B05B 1/0854 239/602 |
| 7,749,360 | B2 * | 7/2010 | Waldron | B01D 5/009 202/205 |
| 8,276,834 | B2 * | 10/2012 | Qiu | B05B 1/1654 239/443 |
| 2007/0017192 | A1 * | 1/2007 | Bednarek | C02F 1/16 55/405 |

* cited by examiner

SPRAY NOZZLE FOR WASHING

CROSS-REFERENCE TO RELATED APPLICATIONS

This application claims the benefit under 35 U.S.C. section 371, of PCT International Application No. PCT/KR2022/016312, filed on Oct. 25, 2022, which claims foreign priority to Korean Patent Application No. 10-2021-0178414, filed on Dec. 14, 2021, in the Korean Intellectual Property Office, both of which are hereby incorporated by reference in their entireties.

TECHNICAL FIELD

The present disclosure relates to a spray nozzle for washing and, more particularly, to a spray nozzle for washing, in which a linear spray inlet and a spiral spray inlet are integrally formed on one nozzle body, thereby enabling linear and spiral washing water to be selectively sprayed while the linear spray inlet and the spiral spray inlet operates organically, a lower end part of a nozzle tip, which forms spiral washing water, moves circumferentially about a shaft, and an upper end part thereof makes linear contact within a packing, thereby preventing abrasion caused by friction and forming spiral washing water without frictional resistance even under weak water pressure, and when forming the spiral washing water, a backflow preventing member closes the linear spray inlet to prevent backflow, thereby enabling a stable operation.

BACKGROUND ART

Generally, a spray nozzle for washing is used to deliver high-pressure washing liquid pumped by a pumping means to a distant object to be washed.

The prior art of the spray nozzle for washing is disclosed in Korean Utility Model Registration No. 20-0291462.

The spray nozzle for washing of the prior art is composed of a guide tube in which high-pressure washing liquid pumped by a pumping means is transported through a transport path of a center thereof, and a spray cap coupled to a first side of the guide tube, wherein the spray cap is provided with multiple spray holes with each of the spray holes having an inner diameter smaller than the inner diameter of the guide tube. In addition, to control the transport of washing liquid guided through the guide tube, an opening and closing means that opens and closes the transport path is provided on a second side of the guide tube.

In the spray nozzle for washing in the prior art configured as described above, high-pressure washing liquid pumped by the pumping means is delivered to the spray cap on the first side of the guide tube through the transport path of the guide tube, and the high-pressure washing liquid delivered to the spray cap is discharged through the spray holes of the spray cap to the outside.

In this case, due to the spray hole having an inner diameter smaller than the inner diameter of the guide tube, the washing liquid increases in a flow rate and reaches a distant object to be washed.

In addition, the opening and closing means opens and closes the transport path of the guide tube to control the discharge of the pumped high-pressure washing liquid.

However, in the spray nozzle for washing of the prior art, since the spray cap is fixed to the guide tube, washing liquid discharged through the spray holes of the spray cap only has the spray force of a straight-line direction, so the spray nozzle has limitation to effectively washing the surface of an object to be washed.

In addition, in order to increase the cleaning effect, an operator has to adjust the guide tube in various directions so that washing liquid hits the surface of an object to be washed in various directions, which was inconvenient.

DISCLOSURE

Technical Problem

The present disclosure has been made to solve the above problems, and a purpose of the present disclosure is to propose a spray nozzle for washing in which a linear spray inlet and a spiral spray inlet are integrally formed on one nozzle body, and linear and spiral washing water are able to be selectively sprayed while the linear spray inlet and the spiral spray inlet operate organically.

In addition, another purpose of the present disclosure is to propose a spray nozzle for washing in which a lower end part of a nozzle tip, which forms spiral washing water, moves circumferentially about a shaft, and an upper end part makes linear contact within a packing, and thus abrasion caused by friction is prevented and spiral washing water without frictional resistance is formed even under weak water pressure.

Additionally, still another purpose of the present disclosure is to propose a spray nozzle for washing in which when forming spiral washing water, a backflow preventing member closes the linear spray inlet to prevent backflow, and thus it is possible to prevent the leakage of washing water and perform a stable operation.

The purposes of the present disclosure are not limited to the purposes mentioned above, and other purposes not mentioned will be clearly understood by those skilled in the art from description below.

Technical Solution

In order to accomplish the above objectives, a spray nozzle for washing of the present disclosure includes: a nozzle body; a linear spray inlet formed on one side of the nozzle body; a spiral spray inlet formed under the linear spray inlet; a rotating part mounted in a rotation space of the nozzle body and rotated by washing water introduced through the spiral spray inlet; a spiral action imparting part configured to be mounted on an upper part of the rotating part and to give spiral action to the washing water introduced through the spiral spray inlet while being moved circumferentially by the rotating part; and a backflow preventing part mounted to the linear spray inlet to open a linear spray flow path when washing water flows into the linear spray inlet and close the linear spray flow path when washing water flows into the spiral spray inlet to prevent backflow, wherein when washing water flows into the linear spray inlet, the backflow preventing part stops a stop protrusion of the rotating part so that the washing water is sprayed in a liner shape, and when washing water flows into the spiral spray inlet, pressure is generated inside the nozzle body, and thus the backflow preventing part moves away from the stop protrusion and closes the linear spray flow path and simultaneously, the washing water is sprayed in a spiral shape.

The nozzle body may be provided with: the rotation space in which the rotating part is mounted and rotates; and an operation space provided at an upper side of the operation space, wherein the spiral action imparting part may move circumferentially in the operation space.

The rotating part may be provided with: a rotating body having rotating blades formed radially thereon; a shaft formed on a lower center of the rotating body and coupled to a groove; the stop protrusion formed on an upper part of the rotating body; an eccentric groove formed eccentrically on an upper inner side of the rotating body; and a finishing cap fixed to a lower part of the nozzle body by rotary coupling and having the groove formed on a central part of the finishing cap so that the shaft is coupled to the groove.

When washing water flows into the nozzle body through the spiral spray inlet, the rotating body may rotate and the stop protrusion may push the backflow preventing part toward the linear spray flow path to prevent backflow of the washing water.

The spiral action imparting part may be provided with: a cover fixed on an upper part of the nozzle body so that washing water is sprayed through a spray hole thereof; a nozzle tip having inlet holes formed radially thereon so that washing water supplied into the nozzle body is sprayed into the spray hole by forming spiral washing water while a lower end part moves circumferentially during rotation of the rotating part when an upper end part is located inside the cover and the lower end part is coupled to an eccentric groove of the rotating part; a packing mounted inside a lower end part of the cover to maintain airtightness; and an airtightness maintenance ring mounted between the cover and the nozzle body to prevent washing water from leaking to the outside of the nozzle body.

When the lower end part of the nozzle tip moves circumferentially while being coupled to the eccentric groove, line contact rolling of the upper end part may occur, wherein the line contact structure may be able to perform an efficient circumferential movement without frictional resistance even under weak water pressure.

The backflow preventing part may be provided with: a backflow preventing body mounted longitudinally on the linear spray flow path; flow path protrusions formed to protrude radially on one end part of the backflow preventing body to form a space for washing water to pass through; and a sealing ring mounted on one side of the flow path protrusions to be in close contact with the linear spray inlet.

Advantageous Effects

According to the present disclosure, the linear spray inlet and the spiral spray inlet are integrally formed on the one nozzle body, thereby enabling linear and spiral washing water to be selectively sprayed while the linear spray inlet and the spiral spray inlet operate organically.

In addition, according to the present disclosure, the lower end part of the nozzle tip, which forms spiral washing water, moves circumferentially about the shaft, and the upper end part thereof makes linear contact within the packing, thereby preventing abrasion caused by friction and forming spiral washing water without frictional resistance even under weak water pressure.

Additionally, according to the present disclosure, when forming spiral washing water, a backflow preventing member closes the linear spray inlet to prevent backflow, thereby enabling a stable operation.

MODE FOR INVENTION

Figure 1:
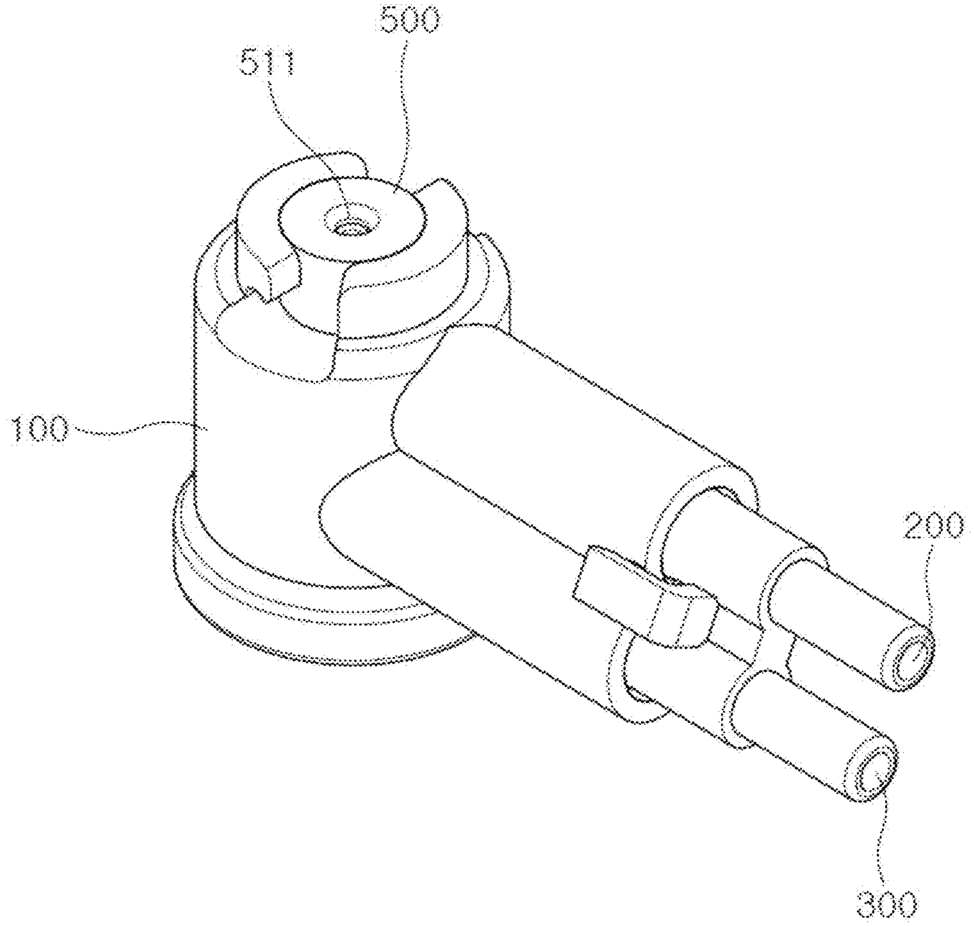
FIG. 1 is a perspective view of a spray nozzle for washing according to the present disclosure.

Hereinafter, various embodiments will be described in more detail with reference to the attached drawings. The embodiments described herein may be modified in various ways. Specific embodiments may be depicted in the drawings and described in detail in the detailed description. However, the specific embodiments disclosed in the attached drawings are only intended to facilitate understanding of the various embodiments. Therefore, the technical idea of the present disclosure is not limited to the specific embodiments disclosed in the attached drawings and should be understood as including all equivalents or substitutes included in the idea and technical scope of the present disclosure.

Terms including ordinal numbers, such as first, second, etc., may be used to describe various components, but these components are not limited by the above-mentioned terms. The above-mentioned terms are used only for the purpose of distinguishing one component from another.

In this specification, terms such as “comprise” or “have” are intended to designate the presence of features, numbers, steps, operations, components, parts, or combinations thereof described in the specification, but should be understood as not excluding in advance the possibility of the existence or addition of one or more other features, numbers, steps, operations, components, parts, or combinations thereof are not intended to indicate the presence of. When a component is mentioned to be “connected” or “joined” to another component, it is understood that the component may be directly connected to or joined to the another component, and that other components may exist therebetween. On the other hand, when it is mentioned that a component is “directly connected” or “directly joined” to another component, it should be understood that there are no other components therebetween.

Meanwhile, a “module” or “unit” for a component used in this specification performs at least one function or operation. In addition the “module” or “unit” may perform a function or operation by hardware, software, or a combination of hardware and software. In addition, a plurality of “modules” or a plurality of “units” excluding a “module” or “unit” that must be performed on specific hardware or performed on at least one processor may be integrated into at least one module. Singular expressions include plural expressions unless the context clearly dictates otherwise.

In addition, when explaining the present disclosure, when it is determined that a specific description of the relevant known function or configuration may unnecessarily obscure the gist of the present disclosure, detailed description thereof is abbreviated or omitted.

Figure 2:
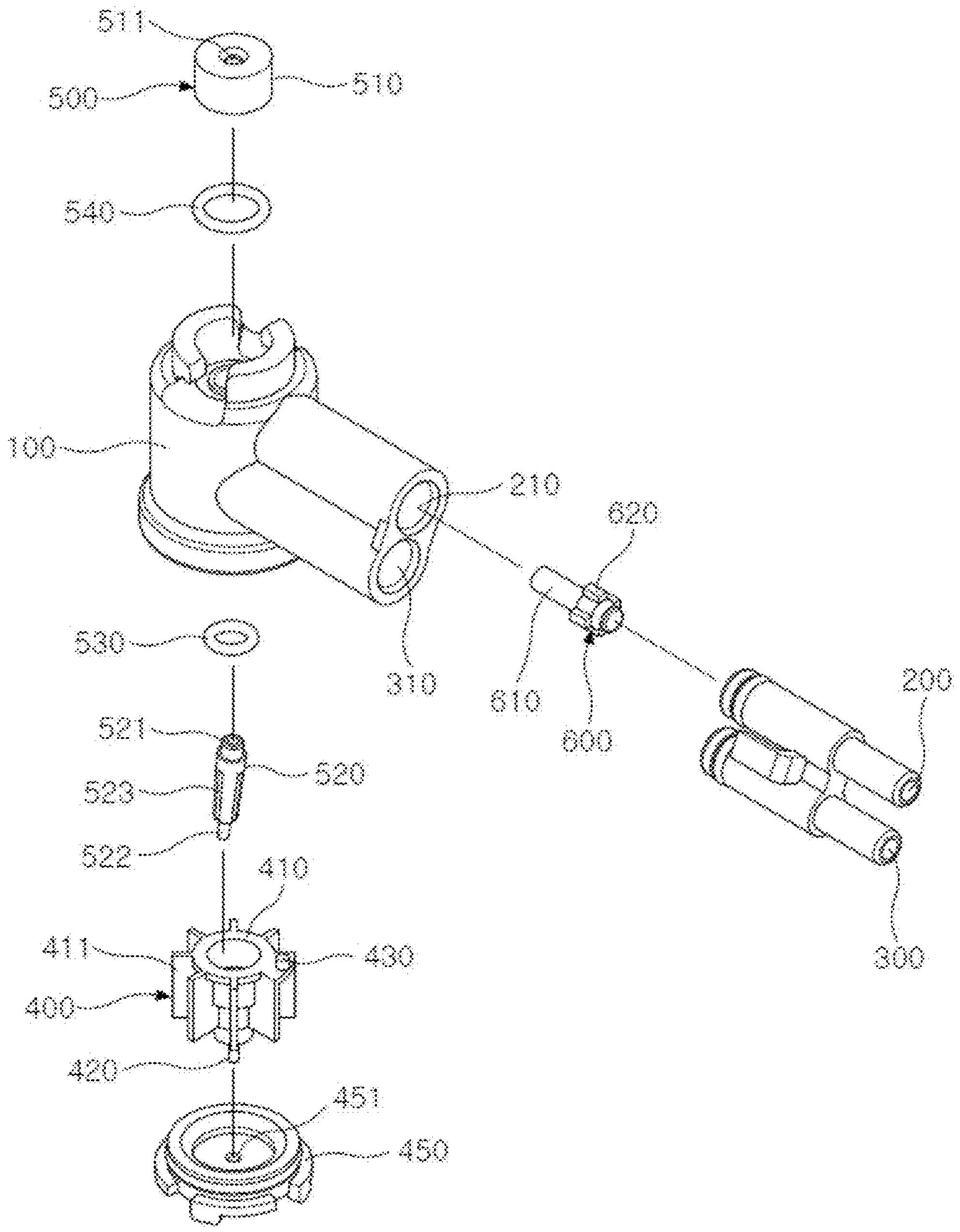
FIG. 2 is an exploded perspective view of the spray nozzle for washing according to the present disclosure.
Figure 3:
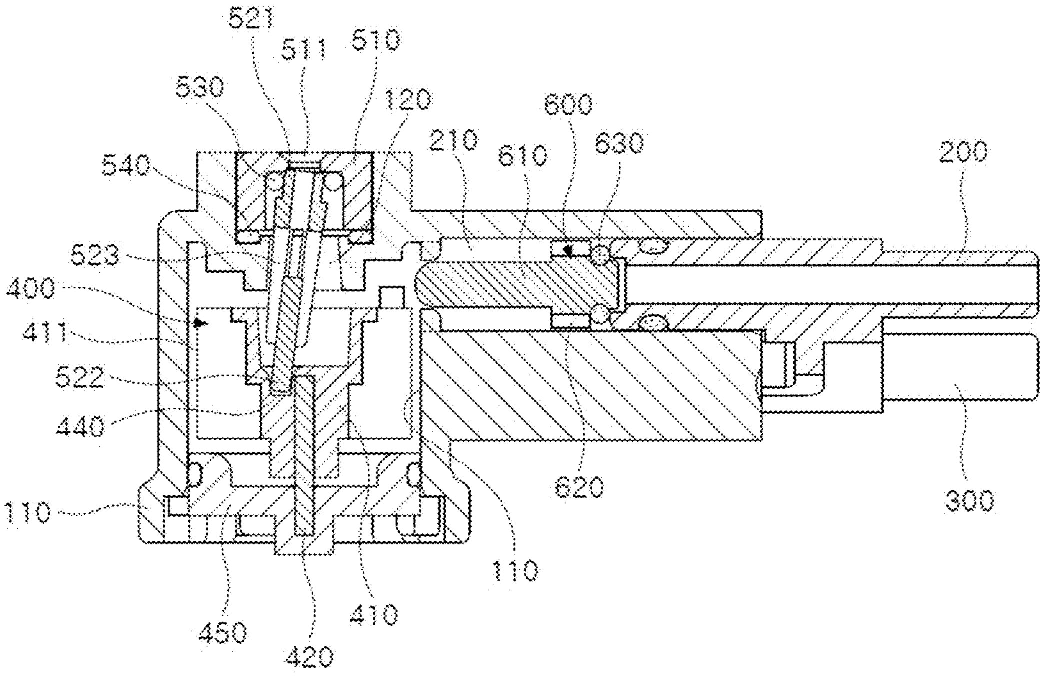
FIG. 3 is a side sectional view of the spray nozzle for washing according to the present disclosure.

FIG. 1 is a perspective view of a spray nozzle for washing according to the present disclosure, FIG. 2 is an exploded perspective view of the spray nozzle for washing according to the present disclosure, and FIG. 3 is a side sectional view of the spray nozzle for washing according to the present disclosure.

The spray nozzle for washing of the present disclosure includes: a nozzle body 100; a linear spray inlet 200 formed on one side of the nozzle body 100; a spiral spray inlet 300 formed under the linear spray inlet 200; a rotating part 400 mounted in a rotation space 110 of the nozzle body 100 and rotated by washing water introduced through the spiral spray inlet 300; a spiral action imparting part 500 configured to be mounted on an upper part of the rotating part 400 and to give spiral action to the washing water introduced through the spiral spray inlet 300 while being moved circumferentially by the rotating part 400; a backflow preventing part 600 mounted to the linear spray inlet 200 to open a linear spray flow path 210 when washing water flows into the linear spray inlet 200 and close the linear spray flow path 210 when washing water flows into the spiral spray inlet 300 to prevent backflow, wherein when washing water flows into the linear spray inlet 200, the backflow preventing part 600 stops a stop protrusion 430 of the rotating part 400 so that the washing water is sprayed in a linear shape, and when washing water flows into the spiral spray inlet 300, pressure is generated inside the nozzle body 100, and thus the backflow preventing part 600 moves away from the stop protrusion 430 and closes the linear spray flow path 210 and simultaneously, the washing water is sprayed in a spiral shape.

The nozzle body 100, which constitutes the basic frame of the spray nozzle, includes the rotation space 110 provided in a lower part thereof which is opposite to a cover 510 so that the rotating part 400 is mounted in the rotation space 110 to rotate, wherein the operation space 120 is formed between the rotation space 110 and the cover 510.

In addition, the linear spray inlet 200 is formed on one side of the nozzle body 100, wherein the linear spray flow path 210 is formed at an inner side close to the nozzle body 100 in the linear spray inlet 200 and communicates with the operation space 120.

The spiral spray inlet 300 is located under the linear spray inlet 200 and is formed on the nozzle body 100, wherein a spiral spray flow path 310 is formed at an inner side close to the nozzle body 100 in the spiral spray inlet 300 and communicates with the rotation space 110.

The linear spray inlet 200 and the spiral spray inlet 300 are integrally formed and are mounted on the nozzle body 100.

In addition, the rotating part 400, which is intended to spray washing water in a spiral shape, is provided with a rotating body 410 having rotating blades 411 formed radially thereon, wherein the shaft 420 is formed on the lower center of the rotating body 410.

The stop protrusion 430 which stops the rotation of the rotating body 410 is formed on the upper part of the rotating body 410, and the central portion of the upper part of the rotating body 410 is recessed to have a predetermined depth, wherein an eccentric groove 440 is formed at an eccentric position on a recessed bottom surface thereof.

A finishing cap 450 is formed under the rotating body 410, with the finishing cap 450 being coupled to the nozzle body 100 by rotary coupling to finish the lower part of the nozzle body 100, and a groove 451 is formed in the center of the upper surface of the finishing cap 450 so that the shaft 420 is coupled to the groove 451.

In addition, the spiral action imparting part 500 moves circumferentially so that washing water supplied while rotating the rotating part 400 is sprayed in a spiral shape through a spray hole 511.

The spiral action imparting part 500 includes the cover 510 fixed on the upper part of the nozzle body 100, and the spray hole 511 formed in the cover 510 to spray washing water to the outside.

A nozzle tip 520 is mounted between the cover 510 and the rotating body 410.

The nozzle tip 520 is formed as a type of shaft with a predetermined length, wherein an upper end part 521 is located inside the cover 510, and a lower end part 522 is coupled to the eccentric groove 440 of the rotating part 400. The nozzle tip 520 has inlet holes 523 formed radially therethrough so that washing water flows therein.

When washing water flows into the rotating part 400 through the spiral spray inlet 300, the rotating body 410 rotates, and the lower end part of the nozzle tip 520 moves circumferentially, thereby causing the washing water to form a spiral shape.

A packing 530 is mounted on the inside of the cover 510, the upper end part 521 of the nozzle tip 520 is inserted into the packing 530, and an airtightness maintenance ring 540 is mounted between the cover 510 and the nozzle body 100 to prevent washing water from leaking to the outside.

Here, when the lower end part 522 of the nozzle tip 520 moves circumferentially while being coupled to the eccentric groove 440, line contact rolling of the upper end part 521 occurs, and the line contact structure is able to perform an efficient circumferential movement without frictional resistance even under weak water pressure.

In addition, the backflow preventing part 600 is provided with a backflow preventing member 610 having a predetermined length that is mounted on the linear spray flow path 210.

The backflow preventing member 610 slides within the linear spray flow path 210 and also serves as a stopper to stop the rotation of the rotating part 400.

That is, when washing water flows into the nozzle body 100 through the linear spray inlet 200, the backflow preventing member 610 moves under the pressure of the washing water and stops the rotation of the stop protrusion 430 of the rotating part 400, and when washing water flows into the nozzle body 100 through the spiral spray inlet 300, the backflow preventing member 610 is pushed toward the linear spray inlet 200 to prevent the backflow of the washing water.

One end part of the backflow preventing member 610 is provided with flow path protrusions 620 that protrude radially therefrom to form a space for efficient introduction of washing water, wherein a sealing ring 630 is mounted on one side of the flow path protrusions 620 and is in close contact with the linear spray inlet 200.

Next, the state of the use of the spray nozzle of the present disclosure configured as above will be described in detail.

Figure 4:
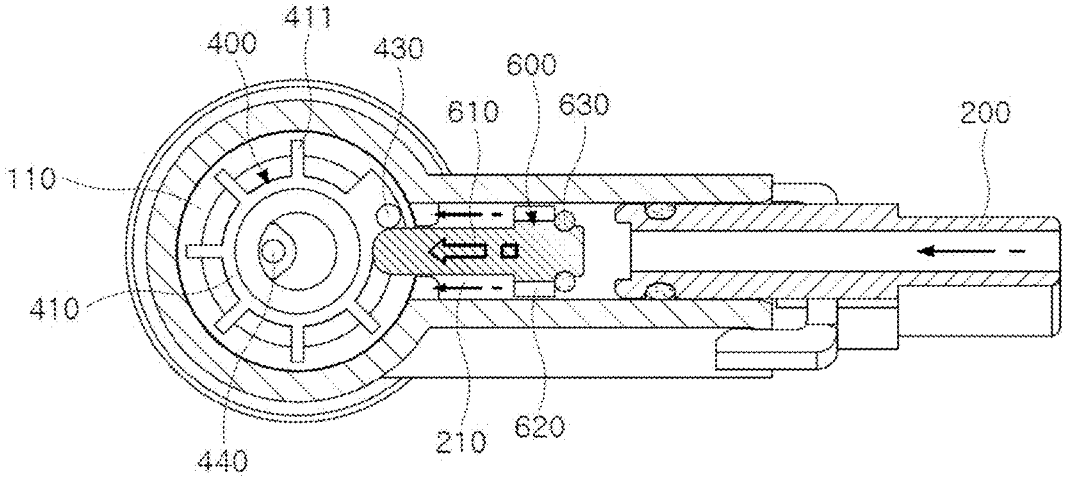
FIGS. 4 and 5 are views illustrating a state of linear washing water being sprayed through a spray hole by supplying washing water to a linear spray inlet of the present disclosure.
Figure 5:
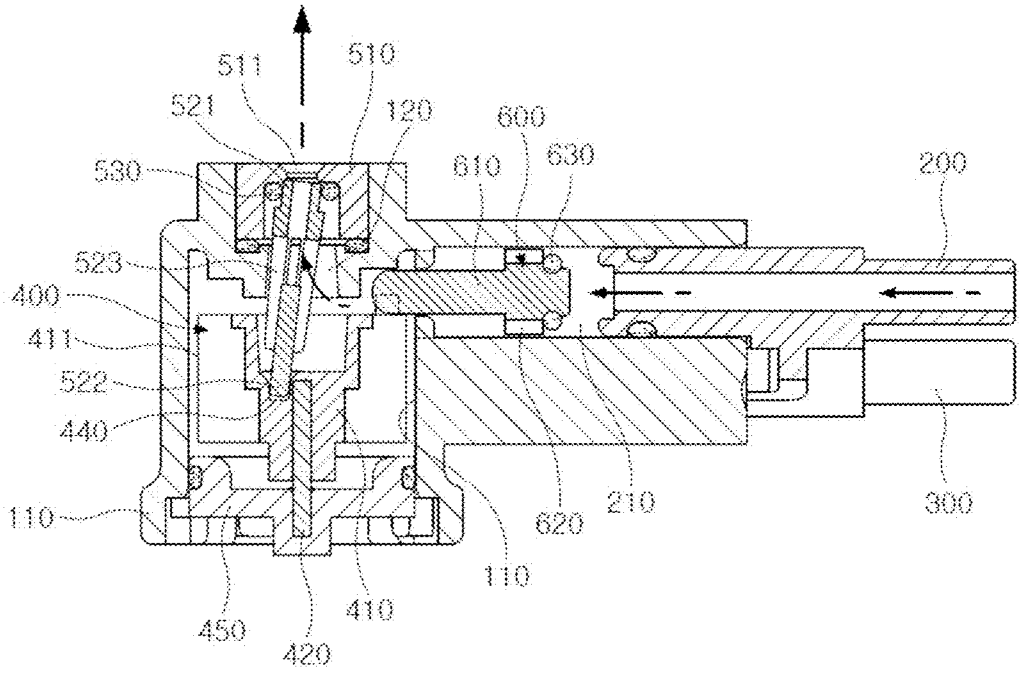

First, as illustrated in FIGS. 4 and 5, when washing water flows into the nozzle body 100 through the linear spray inlet 200, the pressure of the washing water presses the backflow preventing member 610 toward the rotating part 400, and the backflow preventing member 610 is spaced apart from the linear spray inlet 200 to open the linear spray flow path 210.

In this case, the backflow preventing member 610 stops the stop protrusion 430 so that the rotating part 400 does not rotate, and the washing water flows into the operation space 120 of the nozzle body 100 through the linear spray flow path 210.

The washing water flowing into the operation space 120 as described above passes through the inlet holes 523 formed radially on the nozzle tip 520 and then is sprayed in a straight line shape through the spray hole 511 formed in the cover 510.

Figure 6:
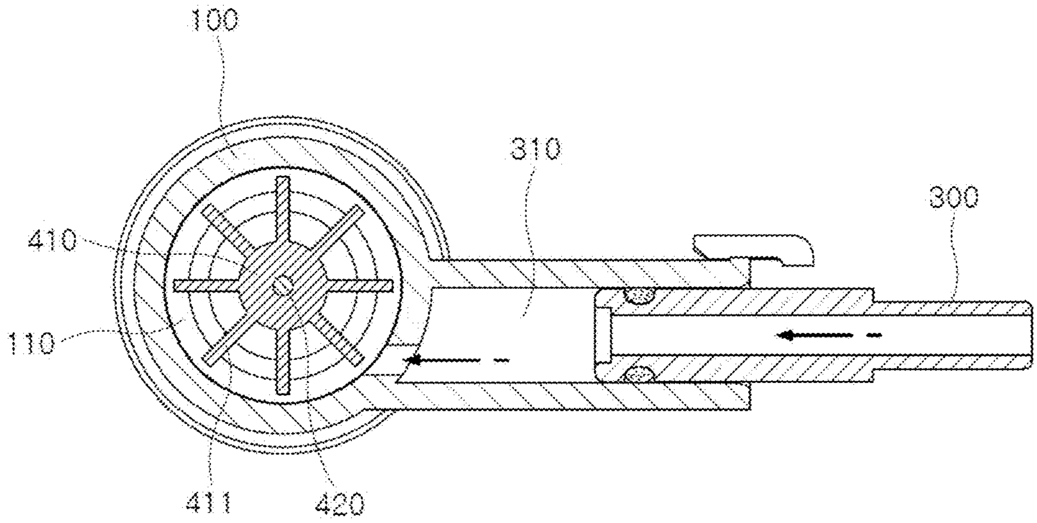
FIGS. 6 to 8 are views illustrating a state of spiral washing water being sprayed through the spray hole by supplying washing water to a spiral spray inlet of the present disclosure.
Figure 7:
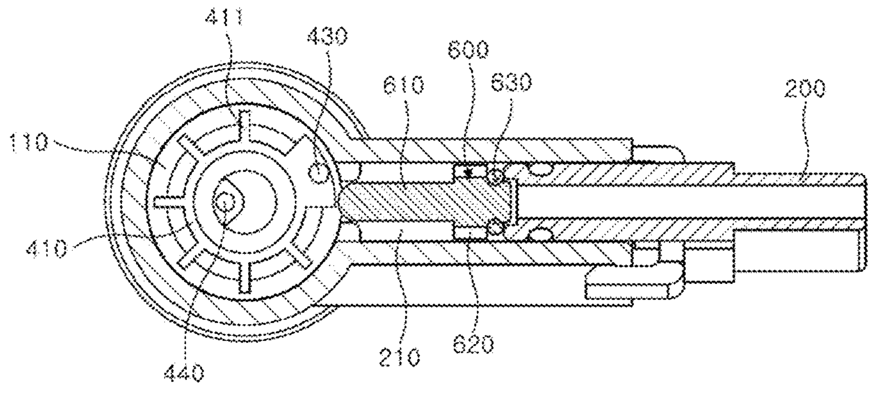
Figure 8:
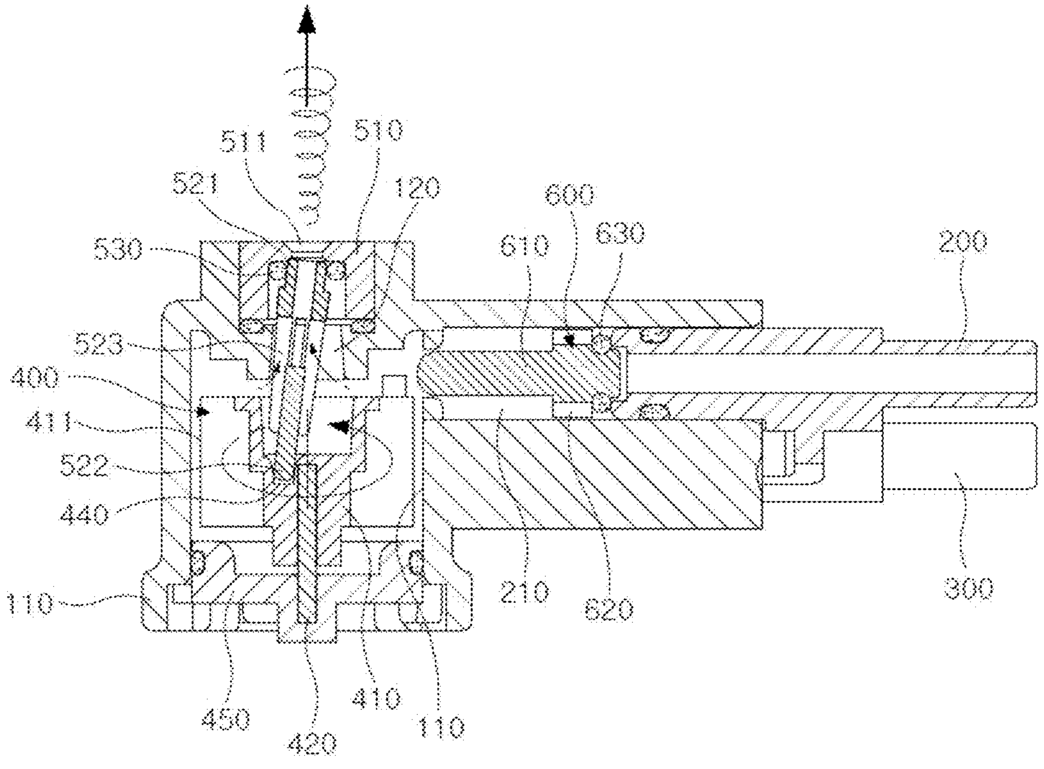

In addition, as illustrated in FIGS. 6 to 8, when washing water flows into the nozzle body 100 through the spiral spray inlet 300, pressure is generated inside the nozzle body 100, and simultaneously, the rotating body 410 rotates about the shaft 420.

Due to the rotation of the rotating body 410 and the pressure of the washing water, the backflow preventing member 610 is pressed toward the linear spray inlet 200, and the sealing ring 630 is in close contact with the end part of the linear spray inlet 200 to prevent backflow.

In this case, the rotating body 410 on which the rotating blades 411 are formed is rotated by the pressure of washing water, the lower end part 522 of the nozzle tip 420 coupled to the rotating body 410 moves circumferentially about the shaft 420 just as the moon rotates around the earth, and the upper end part 521 performs line contact rolling inside the packing 530.

In this process, the washing water forms a spiral shape, wherein the spiral washing water is sprayed through the inlet holes 523 formed radially in the nozzle tip 520 and the spray hole 511 formed in the cover 510.

That is, according to the present disclosure, the linear spray inlet 200 and the spiral spray inlet 300 are integrally formed on the one nozzle body 100, and linear and spiral washing water may selectively be sprayed while the linear spray inlet 200 and the spiral spray inlet 300 operate organically.

Additionally, according to the present disclosure, the lower end part 522 of the nozzle tip 520, which forms spiral washing water, moves circumferentially about the shaft 420, and the upper end part 521 makes linear contact within the packing 530, thereby preventing abrasion caused by friction and forming spiral washing water without frictional resistance even under weak water pressure.

In addition, when forming spiral washing water, a backflow preventing member 610 closes the linear spray inlet 200 to prevent backflow, thereby enabling a stable operation.

Although exemplary embodiments of the present disclosure have been shown and described, the present disclosure is not limited to the specific embodiments described above, and the embodiments may be variously modified by those skilled in the art in the technical field to which the invention pertains without departing from the gist of the present disclosure as claimed in the claims, and these modified implementations should not be understood individually from the technical ideas or perspectives of the present disclosure.

The invention claimed is:

1. A spray nozzle for washing, the spray nozzle comprising:
- a nozzle body (100);
- a linear spray inlet (200) formed on one side of the nozzle body (100);
- a spiral spray inlet (300) formed under the linear spray inlet (200);
- a rotating part (400) mounted in a rotation space (110) of the nozzle body (100) and rotated by washing water introduced through the spiral spray inlet (300);
- a spiral action imparting part (500) configured to be mounted on an upper part of the rotating part (400) and to give spiral action to the washing water introduced through the spiral spray inlet (300) while being moved circumferentially by the rotating part (400); and
- a backflow preventing part (600) mounted to the linear spray inlet (200) to open a linear spray flow path (210) when washing water flows into the linear spray inlet (200) and close the linear spray flow path (210) when washing water flows into the spiral spray inlet (300) to prevent backflow,
- wherein when washing water flows into the linear spray inlet (200), the backflow preventing part (600) stops a stop protrusion (430) of the rotating part (400) so that the washing water is sprayed in a liner shape, and when washing water flows into the spiral spray inlet (300), pressure is generated inside the nozzle body (100), and thus the backflow preventing part (600) moves away from the stop protrusion (430) and closes the linear spray flow path (210) and simultaneously, the washing water is sprayed in a spiral shape.

2. The spray nozzle of claim 1, wherein the nozzle body (100) is provided with:
- the rotation space (110) in which the rotating part (400) is mounted and rotates; and
- an operation space (120) provided at an upper side of the operation space (110), wherein the spiral action imparting part (500) moves circumferentially in the operation space (120).

3. The spray nozzle of claim 1, wherein the rotating part (400) is provided with:
- a rotating body (410) having rotating blades (411) formed radially thereon;
- a shaft (420) formed on a lower center of the rotating body (410) and coupled to a groove (451);
- the stop protrusion (430) formed on an upper part of the rotating body (410);
- an eccentric groove (440) formed eccentrically on an upper inner side of the rotating body (410); and
- a finishing cap (450) fixed to a lower part of the nozzle body (100) by rotary coupling and having the groove (451) formed on a central part of the finishing cap (450) so that the shaft (420) is coupled to the groove (451).

4. The spray nozzle of claim 3, wherein when washing water flows into the nozzle body (100) through the spiral spray inlet (300), the rotating body (410) rotates and the stop protrusion (430) pushes the backflow preventing part (600) toward the linear spray flow path (210) to prevent backflow of the washing water.

5. The spray nozzle of claim 1, wherein the spiral action imparting part (500) is provided with:
- a cover (510) fixed on an upper part of the nozzle body (100) so that washing water is sprayed through a spray hole (511) thereof;
- a nozzle tip (520) having inlet holes (523) formed radially thereon so that washing water supplied into the nozzle body (100) is sprayed into the spray hole (511) by forming spiral washing water while a lower end part (522) moves circumferentially during rotation of the rotating part (400) when an upper end part (521) is located inside the cover (510) and the lower end part (522) is coupled to an eccentric groove (440) of the rotating part (400);
- a packing (530) mounted inside a lower end part of the cover (510) to maintain airtightness; and
- an airtightness maintenance ring (540) mounted between the cover (510) and the nozzle body (100) to prevent washing water from leaking to the outside of the nozzle body (100).

6. The spray nozzle of claim 5, wherein when the lower end part (522) of the nozzle tip (520) moves circumferentially while being coupled to the eccentric groove (440), line contact rolling of the upper end part (521) occurs, wherein the line contact structure is able to perform an efficient circumferential movement without frictional resistance even under weak water pressure.

7. The spray nozzle of claim 1, wherein the backflow preventing part (600) is provided with:

a backflow preventing body (610) mounted longitudinally on the linear spray flow path (210);

flow path protrusions (620) formed to protrude radially on one end part of the backflow preventing body (610) to form a space for washing water to pass through; and a sealing ring (630) mounted on one side of the flow path protrusions (620) to be in close contact with the linear spray inlet (200).

* * * * *